(12) United States Patent
Prabhu et al.

(10) Patent No.: US 9,025,421 B1
(45) Date of Patent: May 5, 2015

(54) DATA STORAGE DEVICE ADJUSTING LASER INPUT POWER TO COMPENSATE FOR TEMPERATURE VARIATIONS

(71) Applicant: Western Digital Technologies, Inc., Irvine, CA (US)

(72) Inventors: Navin E. Prabhu, Irvine, CA (US); Phillip S. Haralson, Huntington Beach, CA (US); Galvin T. Chia, Rancho Santa Margarita, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/509,322

(22) Filed: Oct. 8, 2014

(51) Int. Cl.
*G11B 13/04* (2006.01)
*G11B 20/10* (2006.01)
*G11B 5/02* (2006.01)
*G11B 5/00* (2006.01)

(52) U.S. Cl.
CPC ............... *G11B 20/105* (2013.01); *G11B 5/02* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,088,074 A | * | 2/1992 | Sato | 369/13.14 |
| 5,116,693 A | * | 5/1992 | Liu et al. | 428/822 |
| 5,329,512 A | * | 7/1994 | Fukimoto et al. | 369/121 |
| 5,353,268 A | * | 10/1994 | Hintz | 369/13.35 |
| 5,508,982 A | * | 4/1996 | Challener, IV | 369/13.51 |
| 5,699,342 A | * | 12/1997 | Yagi et al. | 369/47.5 |
| 6,018,789 A | | 1/2000 | Sokolov et al. | |
| 6,065,095 A | | 5/2000 | Sokolov et al. | |
| 6,078,452 A | | 6/2000 | Kittilson et al. | |
| 6,081,447 A | | 6/2000 | Lofgren et al. | |
| 6,084,830 A | * | 7/2000 | Ashinuma et al. | 369/13.47 |
| 6,092,149 A | | 7/2000 | Hicken et al. | |
| 6,092,150 A | | 7/2000 | Sokolov et al. | |
| 6,094,707 A | | 7/2000 | Sokolov et al. | |
| 6,105,104 A | | 8/2000 | Guttmann et al. | |
| 6,111,717 A | | 8/2000 | Cloke et al. | |
| 6,145,052 A | | 11/2000 | Howe et al. | |
| 6,175,893 B1 | | 1/2001 | D'Souza et al. | |
| 6,178,056 B1 | | 1/2001 | Cloke et al. | |
| 6,191,909 B1 | | 2/2001 | Cloke et al. | |
| 6,195,218 B1 | | 2/2001 | Guttmann et al. | |
| 6,205,494 B1 | | 3/2001 | Williams | |
| 6,208,477 B1 | | 3/2001 | Cloke et al. | |
| 6,223,303 B1 | | 4/2001 | Billings et al. | |
| 6,230,233 B1 | | 5/2001 | Lofgren et al. | |
| 6,246,346 B1 | | 6/2001 | Cloke et al. | |
| 6,249,393 B1 | | 6/2001 | Billings et al. | |
| 6,256,695 B1 | | 7/2001 | Williams | |

(Continued)

OTHER PUBLICATIONS

Abhimanyu Sharma, et al., U.S. Appl. No. 13/763,972, filed Feb. 11, 2013, 16 pages.

*Primary Examiner* — Peter Vincent Agustin (57) ABSTRACT

A data storage device is disclosed comprising a head actuated over a disk, wherein the head comprises a laser configured to heat the disk while writing data to the disk. A temperature is measured, and a first input power is generated based on a first function of the measured temperature, wherein the first function compensates for a temperature dependent output power of the laser. A second input power is generated based on a second function of the measured temperature, wherein the second function compensates for a temperature dependent coercivity of the disk. The first input power is combined with the second input power to generate a write power applied to the laser while writing data to the disk.

16 Claims, 4 Drawing Sheets

(56) References Cited

U.S. PATENT DOCUMENTS

| | | |
|---|---|---|
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,671,232 B1 * | 12/2003 | Stupp ................ 369/13.02 |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,762,977 B1 * | 7/2004 | Gage et al. ................ 369/13.13 |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |

(56) References Cited

U.S. PATENT DOCUMENTS

| | | |
|---|---|---|
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,149,652 B2 * | 4/2012 | Erden et al. ............... 369/13.02 |
| 8,154,812 B1 | 4/2012 | Boyle et al. |
| 8,159,768 B1 | 4/2012 | Miyamura |

(56) References Cited

U.S. PATENT DOCUMENTS

| | | |
|---|---|---|
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,369,191 B2 | 2/2013 | Shimazawa |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 * | 5/2013 | Thayamballi et al. ........ 369/116 |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,547,805 B1 | 10/2013 | Komura et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2005/0078563 A1 * | 4/2005 | Verschuren ................ 369/13.05 |
| 2005/0226102 A1 * | 10/2005 | Immink et al. ............. 369/13.05 |
| 2009/0113702 A1 | 5/2009 | Hogg |
| 2009/0135867 A1 | 5/2009 | Hsu et al. |
| 2009/0310459 A1 * | 12/2009 | Gage et al. .................... 369/100 |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0077453 A1 | 3/2013 | Alex |

\* cited by examiner

DATA STORAGE DEVICE ADJUSTING LASER INPUT POWER TO COMPENSATE FOR TEMPERATURE VARIATIONS

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

DETAILED DESCRIPTION

Figure 1A:
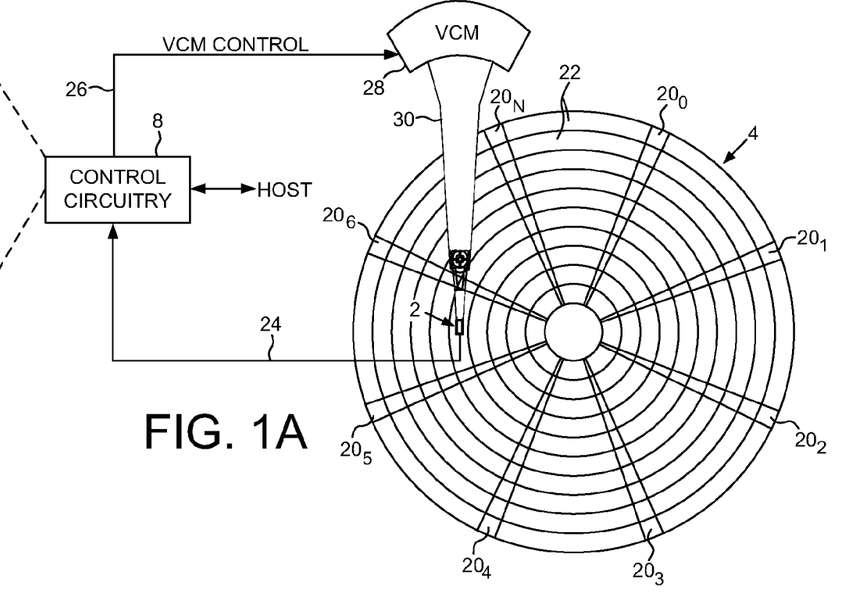
FIG. 1A shows a data storage device in the form of a disk drive according to an embodiment comprising a head actuated over a disk.

FIG. 1A shows a data storage device in the form of a disk drive according to an embodiment comprising a head 2 actuated over a disk 4, wherein the head 2 (FIG. 1B) comprises a laser 6 configured to heat the disk 4 while writing data to the disk 4. The disk drive further comprises control circuitry 8 configured to execute the flow diagram of FIG. 1C. A temperature is measured (block 10), and a first input power is generated based on a first function of the measured temperature (block 12), wherein the first function compensates for a temperature dependent output power of the laser. A second input power is generated based on a second function of the measured temperature (block 14), wherein the second function compensates for a temperature dependent coercivity of the disk. The first input power is combined with the second input power to generate a write power (block 16) applied to the laser while writing data to the disk (block 18).

In the embodiment of FIG. 1A, the disk 4 comprises a plurality of servo sectors $20_0$-$20_N$ that define a plurality of servo tracks 22, wherein data tracks are defined relative to the servo tracks at the same or different radial density. The control circuitry 8 processes a read signal 24 emanating from the head 2 to demodulate the servo sectors $20_0$-$20_N$ and generate a position error signal (PES) representing an error between the actual position of the head and a target position relative to a target track. The control circuitry 8 filters the PES using a suitable compensation filter to generate a control signal 26 applied to a voice coil motor (VCM) 28 which rotates an actuator arm 30 about a pivot in order to actuate the head 2 radially over the disk 4 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

Figure 1B:
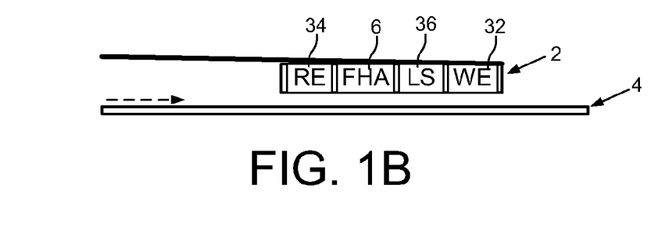
FIG. 1B shows a head according to an embodiment comprising a laser configured to heat the disk while writing data to the disk.
Figure 1C:
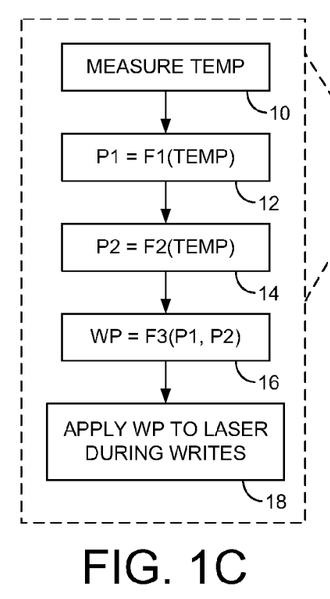
FIG. 1C is a flow diagram according to an embodiment wherein a first input power is generated based on a first function of the measured temperature that compensates for a temperature dependent output power of the laser, and a second input power is generated based on a second function of the measured temperature that compensates for a temperature dependent coercivity of the disk.

Any suitable head 2 may be employed in the embodiments, wherein in the embodiment of FIG. 1B the head 2 comprises a suitable write element 32 (e.g., an inductive coil), a suitable read element 34 (e.g., a magnetoresistive element), and a suitable fly height actuator (FHA) 36 configured to actuate the head 2 vertically over the disk 4. Any suitable FHA 36 may be employed, such as a heater that actuates through thermal expansion, or a piezoelectric actuator that actuates through mechanical deflection. The head 2 in the embodiment of FIG. 1B may also comprise any suitable laser 6 (such as a laser diode) that exhibits a temperature dependent output power.

In one embodiment, the write power applied to the laser 6 is calibrated so as to achieve a target output power, thereby enabling sufficient saturation of the magnetic surface as well as a target write width (and corresponding track width). Since in one embodiment the output power of the laser 6 varies with temperature, the target write power may be adjusted to compensate for changes in temperature. In one embodiment, the target output power may also vary based on the temperature due to the heating (or cooling) effect on the disk 4. For example, higher temperatures may heat the disk 4 so that less output power from the laser 6 is needed to achieve the target saturation level and target write width. In one embodiment, the effect of temperature on the operating characteristics of the laser 6 is compensated using a first function, and the effect of temperature on the disk 4 is compensated using a second function.

Figure 2A:
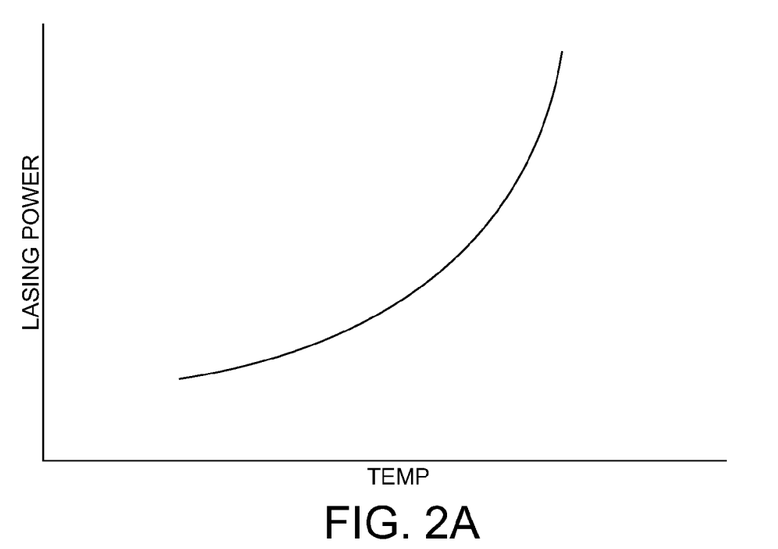
FIG. 2A shows an example embodiment for the first function of the measured temperature.
Figure 3:
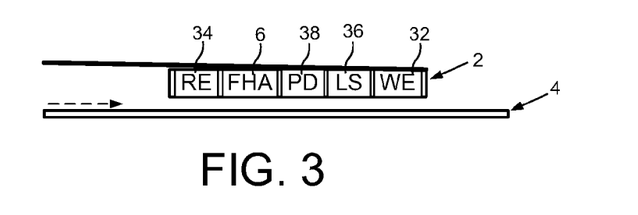
FIG. 3 shows an embodiment wherein the head further comprises a photodiode configured to measure the output power of the laser.

FIG. 2A shows an example of how the temperature may affect an operating characteristic of the laser 6, wherein in this example the operating characteristic is the level of input power needed for the laser 6 to begin lasing (lasing power). In this example, the level of lasing power increases non-linearly (e.g., parabolically) with increasing temperature such that the first function of temperature at block 12 of FIG. 1C may be represented by a suitable polynomial. Any suitable technique may be employed to generate the first function such as shown in FIG. 2A. In one embodiment, the first function may be characterized by evaluating a subset of lasers in order to generate a nominal function representing a typically laser 6 employed in a production disk drive. For example, the nominal function may be provided by a manufacturer of the laser 6, or in another embodiment the nominal function may be characterized by a manufacturer of the disk drive which may then be loaded into each production disk drive. In another embodiment, the output power characteristics of the laser over a varying temperature may be measured for each laser 6 in each production disk drive. For example, in an embodiment shown in FIG. 3 the head 2 may comprise a suitable photodiode 38 which the control circuitry may evaluate to measure the output power of the laser 6 over a plurality of temperatures. The data points representing the input power, measured output power, and temperature may then be curve fitted using any suitable technique in order to generate the first function such as shown in FIG. 2A (e.g., by generating coefficients of a polynomial).

Figure 2B:
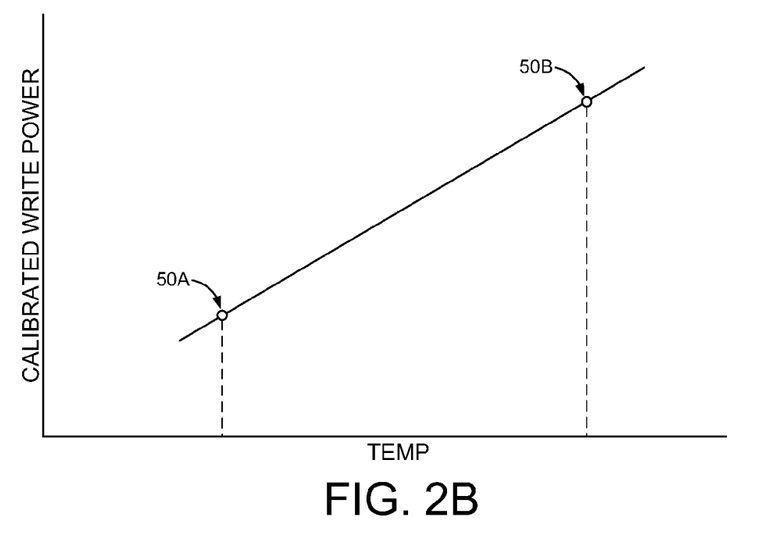
FIG. 2B shows an example embodiment for the second function of the measured temperature.

In one embodiment, adjusting the input power applied to the laser using the first function of temperature (such as shown in FIG. 2A) linearizes the second function of temperature that compensates for the temperature effect on the disk 4. For example, in one embodiment a first input power is generated based on the first function of temperature, and then a second input power generated based on the second function is added to the first input power to generate the write power applied to the laser 6. That is, the second input power becomes an offset from a baseline input power established by the first function. In the example of FIGS. 2A and 2B, the first (baseline) input power may be the lasing power for the current temperature, and the second input power may be the additional power needed to achieve the target output power, wherein the second input power may be generated based on a linear function of the temperature.

In the embodiment where the second function is a linear function such as shown in the example of FIG. 2B, the linear function may be estimated by calibrating the optimal write power over a small number of data points (e.g., two data points) and then curve fitting the data points to a line. This embodiment is understood with reference to the flow diagram of FIG. 4 wherein a first calibration power P1 is generated using the first function at a first temperature (block 40). The first calibration power is then applied to the laser at the first temperature and a first write power is calibrated that provides adequate write quality (block 42). Any suitable technique may be employed to calibrate the write power, such as by iteratively writing/reading a test pattern at different write powers until a quality metric is optimized. The first function is used to generate a second calibration power based on a second temperature (block 44). The second calibration power is applied to the laser at the second temperature, and a second write power is calibrated that provides adequate write quality (block 46). The second function may then be generated based on the first and second temperatures and the first and second calibrated write powers (block 48). In the example of FIG. 2B, the second function may be generated by computing the line that passes the two write powers calibrated at two different temperatures. Accordingly, in this embodiment employing a first function to compensate for the temperature effect on the laser 6 simplifies the generation of the second function that compensates for the temperature effect on the disk by linearizing the second function so that as few as two data points may be needed to characterize the second function.

In one embodiment, the control circuitry 8 may be configured to measure a degradation of the laser 6 over time. For example, at a given temperature the amount of input power needed to achieve the target output power may increase over time as the laser 6 degrades. The degradation of the laser may be detected in any suitable manner, such as by evaluating a quality metric of a read signal generated by reading data (or a test pattern) written at the currently calibrated write power. In on embodiment, the control circuitry 8 may adjust the first function based on the measured degradation of the laser. In another embodiment, a general degradation of the laser 6 over time may be assumed such that the control circuitry may measure an operating interval of the laser (interval the laser is on) over a life of the disk drive. The control circuitry 8 may then adjust the first function based on the measured operating interval.

Figure 5:
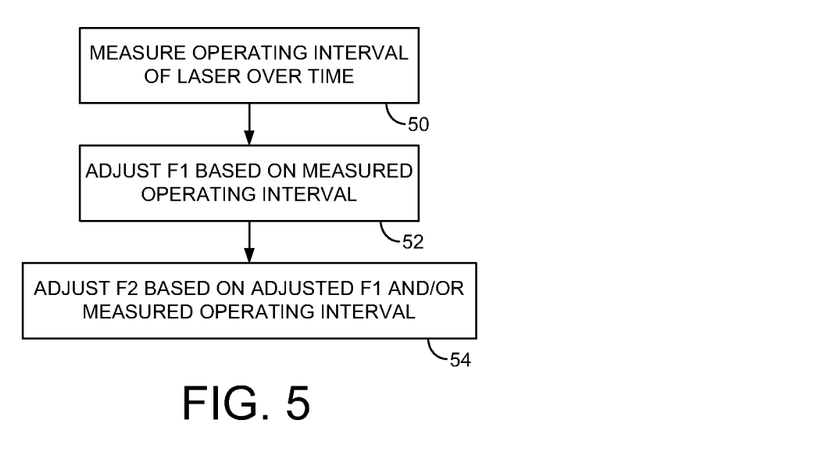
FIG. 5 is a flow diagram according to an embodiment wherein the first function is adjusted over time based on a measured operating interval, and the second function is adjusted based on at least one of the adjusted first function and the measured operating interval.
Figure 6A:
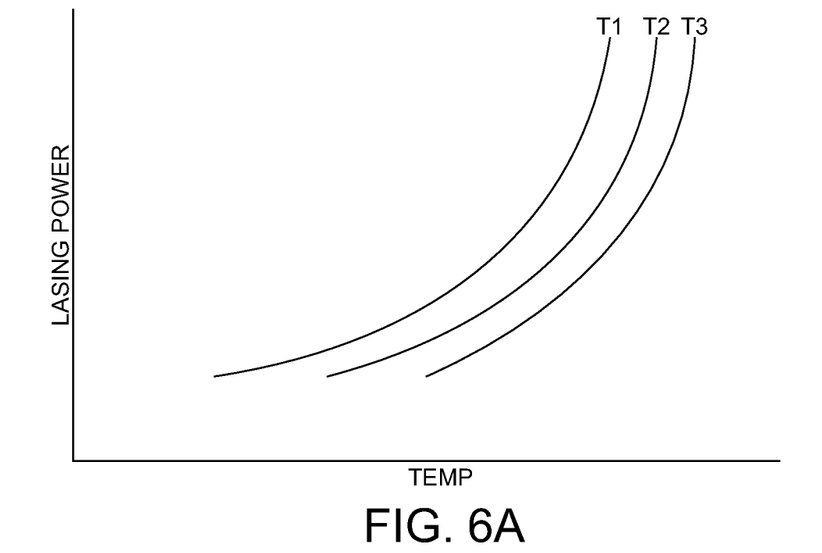
FIG. 6A shows an example embodiment wherein the first function is adjusted over time based on a measured operating interval.
Figure 6B:
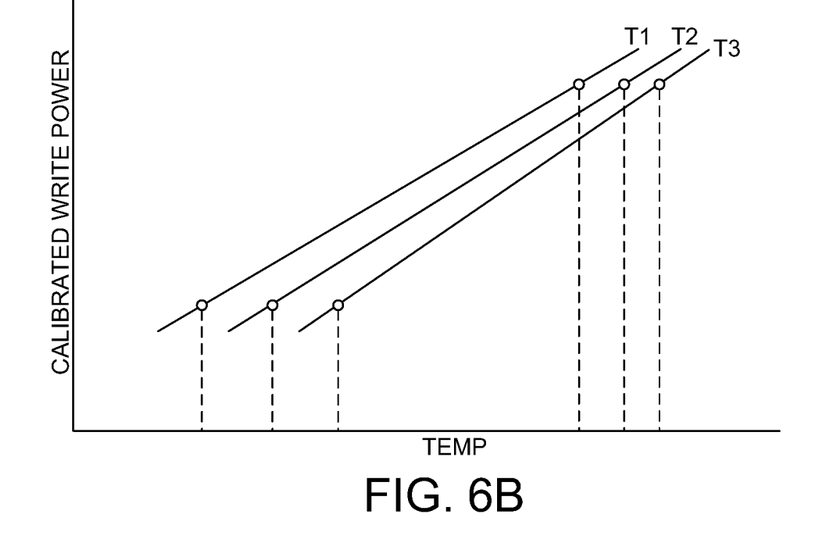
FIG. 6B shows an example embodiment wherein the second function is adjusted based on at least one of the adjusted first function and the measured operating interval.

FIG. 6A illustrates an example of this embodiment wherein the non-linear function representing the temperature effect on the lasing power may shift right over time (i.e., the lasing power as a function of temperature may increase over time). In one embodiment, this shift in the lasing power function over time may be characterized for a subset of lasers during manufacturing so that a nominal shift as a function of time may be assumed for each production disk drive. In this manner, the control circuitry 8 may adjust the first function at various operating intervals (e.g., T1, T2, and T3) as illustrated in the example of FIG. 6A. Referring to the flow diagram of FIG. 5, after measuring the operating interval of the laser (block 50) and adjusting the first function based on the operating interval (block 52), the control circuitry 8 may also adjust the second function based on at least one of the adjusted first function and the measured operating interval (block 54). An example of this embodiment is illustrated in FIG. 6B wherein the slope of the second function may be adjusted based on the adjustment made to the first function as shown in FIG. 6A, and/or based on the operating interval.

Figure 4:
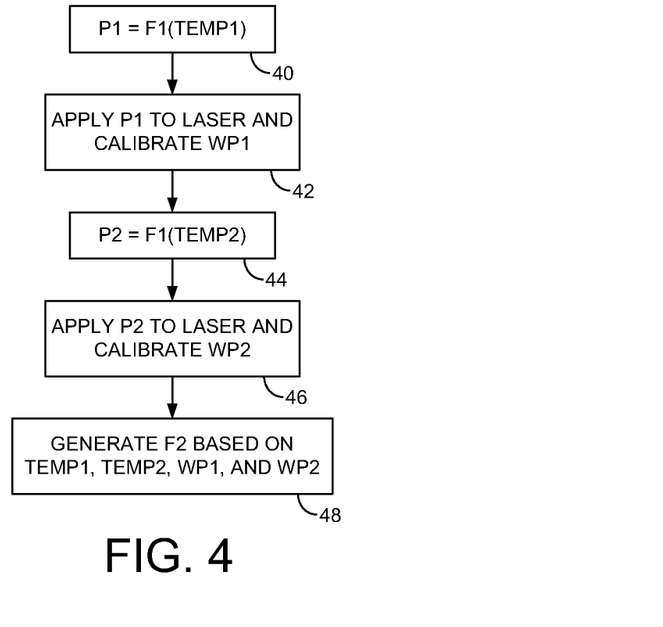
FIG. 4 is a flow diagram according to an embodiment wherein the second function is generated by calibrating a write power applied to the laser at two different temperatures.

In yet another embodiment, after adjusting the first function based on the operating interval as illustrated in FIG. 6A, the control circuitry 8 may adjust the second function by re-executing the flow diagram of FIG. 4. That is, the control circuitry 8 may calibrate the write power at two different temperatures using the adjusted first function, and then regenerate the second function by computing the slope of the line through the new data points. Since in one embodiment the first function linearizes the second function, regenerating the second function at various intervals over the life of the disk drive is simplified since as few as two data points (two calibrated write powers) may be needed to regenerate the second function.

In one embodiment, the write power applied to the laser may also be calibrated based on the fly height of the head (i.e., based on the power applied to the FHA 36). That is, as the fly height of the head increases, more input power may be needed to achieve the desired saturation of the media and the target write width. Accordingly, in one embodiment the write power applied to the laser may be generated based on the first function of temperature such as shown in FIG. 2A, the second function of temperature such as shown in FIG. 2B, and a third function of FHA 36 power (or measured fly height).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head actuated over the disk, wherein the head comprises a laser configured to heat the disk while writing data to the disk; and
    control circuitry configured to:
    measure a temperature;
    generate a first input power based on a first function of the measured temperature, wherein the first function compensates for a temperature dependent output power of the laser;
    generate a second input power based on a second function of the measured temperature, wherein the second function compensates for a temperature dependent coercivity of the disk; and
    combine the first input power with the second input power to generate a write power applied to the laser while writing data to the disk.

2. The data storage device as recited in claim 1, wherein the control circuitry is further configured to:
    measure the output power of the laser over a plurality of temperatures; and
    generate the first function based on the measured output powers.

3. The data storage device as recited in claim 2, wherein the head further comprises a photodiode, and the control circuitry is further configured to measure the output power of the laser over the plurality of temperatures based on the photodiode.

4. The data storage device as recited in claim 1, wherein the control circuitry is further configured to:
    use the first function to generate a first calibration power based on a first temperature;
    apply the first calibration power to the laser at the first temperature and calibrate a first write power that provides adequate write quality;
    use the first function to generate a second calibration power based on a second temperature;
    apply the second calibration power to the laser at the second temperature and calibrate a second write power that provides adequate write quality; and
    generate the second function based on the first and second temperatures and the first and second calibrated write powers.

5. The data storage device as recited in claim 1, wherein:
    the first function comprises a substantially non-linear function; and
    the second function comprises a substantially linear function.

6. The data storage device as recited in claim 1, wherein the control circuitry is further configured to:
    measure a degradation of the laser over time; and
    adjust the first function based on the measured degradation of the laser.

7. The data storage device as recited in claim 1, wherein the control circuitry is further configured to:
    measure an operating interval of the laser over a life of the data storage device; and
    adjust the first function based on the measured operating interval.

8. The data storage device as recited in claim 7, wherein the control circuitry is further configured to adjust the second function based on at least one of the adjusted first function and the measured operating interval.

9. A method of operating a data storage device, the method comprising:
    measuring a temperature;
    generating a first input power based on a first function of the measured temperature, wherein the first function compensates for a temperature dependent output power of a laser;

generating a second input power based on a second function of the measured temperature, wherein the second function compensates for a temperature dependent coercivity of a disk; and combining the first input power with the second input power to generate a write power applied to the laser while writing data to the disk.

10. The method as recited in claim 9, further comprising:
measuring the output power of the laser over a plurality of temperatures; and generating the first function based on the measured output powers.

11. The method as recited in claim 10, further comprising measuring the output power of the laser over the plurality of temperatures based on a photodiode.

12. The method as recited in claim 9, further comprising:
using the first function to generate a first calibration power based on a first temperature;

applying the first calibration power to the laser at the first temperature and calibrate a first write power that provides adequate write quality;

using the first function to generate a second calibration power based on a second temperature;

applying the second calibration power to the laser at the second temperature and calibrate a second write power that provides adequate write quality; and generating the second function based on the first and second temperatures and the first and second calibrated write powers.

13. The method as recited in claim 9, wherein:
the first function comprises a substantially non-linear function; and the second function comprises a substantially linear function.

14. The method as recited in claim 9, further comprising:
measuring a degradation of the laser over time; and adjusting the first function based on the measured degradation of the laser.

15. The method as recited in claim 9, further comprising:
measuring an operating interval of the laser over a life of the data storage device; and adjusting the first function based on the measured operating interval.

16. The method as recited in claim 15, further comprising adjusting the second function based on at least one of the adjusted first function and the measured operating interval.

\* \* \* \* \*